US010607234B2

(12) United States Patent
Micali et al.

(10) Patent No.: US 10,607,234 B2
(45) Date of Patent: Mar. 31, 2020

(54) COUNTERFEIT PREVENTION

(71) Applicant: Silvio Micali, Brookline, MA (US)

(72) Inventors: Silvio Micali, Brookline, MA (US);
Srinivas Devadas, Lexington, MA (US)

(73) Assignee: Silvio MICALI, Brookline, MA (US)

( * ) Notice: Subject to any disclaimer, the term of this patent is extended or adjusted under 35 U.S.C. 154(b) by 87 days.

(21) Appl. No.: 15/522,348

(22) PCT Filed: Jul. 22, 2015

(86) PCT No.: PCT/US2015/041564
§ 371 (c)(1),
(2) Date: Apr. 27, 2017

(87) PCT Pub. No.: WO2016/073041
PCT Pub. Date: May 12, 2016

(65) Prior Publication Data
US 2017/0330200 A1    Nov. 16, 2017

Related U.S. Application Data

(60) Provisional application No. 62/078,011, filed on Nov. 11, 2014, provisional application No. 62/074,288, filed on Nov. 3, 2014.

(51) Int. Cl.
*G06F 21/00* (2013.01)
*G06Q 30/00* (2012.01)
(Continued)

(52) U.S. Cl.
CPC ......... *G06Q 30/0185* (2013.01); *B42D 25/29* (2014.10); *B42D 25/324* (2014.10);
(Continued)

(58) Field of Classification Search
CPC .... G06Q 30/0185; G06Q 10/08; B42D 25/29; B42D 25/324; G06F 7/58; G06F 7/582;
(Continued)

(56) References Cited

U.S. PATENT DOCUMENTS 5,478,990 A    12/1995 Montanari et al.
6,513,118 B1 *  1/2003 Iwamura ............... G06Q 20/382
                                                        705/64
(Continued)

OTHER PUBLICATIONS

U.S. Appl. No. 15/743,336, filed Jan. 10, 2018, Micali.
(Continued)

*Primary Examiner* — Ghodrat Jamshidi
(74) *Attorney, Agent, or Firm* — Muirhead and Saturnelli, LLC

(57) ABSTRACT

Generating a uniquely authentic copy of information uses a physical device that consistently produces unpredictable outputs based on inputs and the microstructure of the device. The device is verified to satisfy a given property. It is substantially difficult to manufacture another device that satisfies the given property and that produces a particular output in response to a particular input. Generating the uniquely authentic copy of information includes causing the device to be provided with a specific input to produce a specific output, causing the generation of a digital signature of the response and the information, and causing at least the device and the digital signature to be made available. Generating the uniquely authentic copy of information may also include making available the information, the specific input, and/or the specific output. The information may be a value of a banknote. The digital signature may be produced on behalf of an issuer.

22 Claims, 5 Drawing Sheets

(51) Int. Cl.
*G06F 7/58* (2006.01)
*B42D 25/29* (2014.01)
*G06Q 10/08* (2012.01)
*G06K 9/00* (2006.01)
*B42D 25/324* (2014.01)
*G06K 19/06* (2006.01)
*G06K 19/10* (2006.01)

(52) U.S. Cl.
CPC ............... *G06F 7/58* (2013.01); *G06F 7/582* (2013.01); *G06K 9/00577* (2013.01); *G06K 19/06037* (2013.01); *G06K 19/10* (2013.01); *G06Q 10/08* (2013.01)

(58) Field of Classification Search
CPC ......... G06K 9/00577; G06K 19/06037; G06K 19/10
See application file for complete search history.

(56) References Cited

U.S. PATENT DOCUMENTS

| | | | |
|---|---|---|---|
| 7,681,103 | B2 | 3/2010 | Devadas et al. |
| 8,072,330 | B1* | 12/2011 | Nichols, Sr. ............. B42D 3/12 340/13.26 |
| 8,427,193 | B1* | 4/2013 | Trimberger ........... H03K 19/003 326/38 |
| 9,947,391 | B1* | 4/2018 | Mahatme .............. G11C 11/419 |
| 2003/0204743 | A1* | 10/2003 | Devadas ................ G06F 21/31 726/9 |
| 2007/0250938 | A1* | 10/2007 | Suh ........................ G06F 21/31 726/34 |
| 2008/0037781 | A1* | 2/2008 | Kocher ............ G11B 20/00086 380/201 |
| 2008/0061980 | A1* | 3/2008 | Kean ...................... G06F 21/76 340/572.1 |
| 2008/0282206 | A1 | 11/2008 | Anderson et al. |
| 2009/0008924 | A1* | 1/2009 | Ophey ................. G06K 19/086 283/85 |
| 2009/0083833 | A1* | 3/2009 | Ziola ...................... G06F 21/31 726/2 |
| 2010/0073147 | A1 | 3/2010 | Merchan et al. |
| 2010/0195916 | A1* | 8/2010 | Blondiaux ........... G06K 19/086 382/209 |
| 2011/0066670 | A1* | 3/2011 | Yu ............................ G06F 7/582 708/252 |
| 2011/0274275 | A1* | 11/2011 | Seitz ...................... G06Q 10/08 380/270 |
| 2013/0127442 | A1* | 5/2013 | Satoh ..................... G01R 25/00 324/76.77 |
| 2013/0147511 | A1* | 6/2013 | Koeberl ................. H03K 19/23 326/8 |
| 2013/0246809 | A1 | 9/2013 | Beckmann et al. |
| 2013/0246881 | A1 | 9/2013 | Goettfert et al. |
| 2014/0091832 | A1 | 4/2014 | Gotze et al. |
| 2014/0201851 | A1* | 7/2014 | Guo ....................... H04L 9/0866 726/34 |
| 2014/0266296 | A1 | 9/2014 | Wang et al. |
| 2014/0334622 | A1 | 11/2014 | Smyth et al. |
| 2015/0101037 | A1* | 4/2015 | Yang ...................... G06F 21/44 726/16 |
| 2016/0079982 | A1* | 3/2016 | Wang ....................... G09C 1/00 327/63 |

OTHER PUBLICATIONS

Srinivas Devadas, et al., "Design and Implementation of PUF-Based "Unclonable" RFID ICs for Anti-Counterfeiting and Security Applications," 2008 IEEE International Conference on RFID, Apr. 16-17, 2008.

Chiraag S. Juvekar, et al., "A Keccak-Based Wireless Authentication Tag with per-Query Key Update and Power-Glitch Attack Countermeasures," 16.2, ISSCC 2016 / Session 16 / Innovations in Circuits and Systems Enabled by Novel Technologies.

* cited by examiner

COUNTERFEIT PREVENTION

CROSS-REFERENCE TO RELATED APPLICATIONS

This application claims priority to U.S. Prov. App. No. 62/074,288, filed Nov. 3, 2014, and entitled "UNFORGE-ABLE BANKNOTES," and to U.S. Prov. App. No. 62/078,011, filed Nov. 11, 2014, and entitled "UNFORGEABLE BANKNOTES," which are all incorporated by reference herein.

TECHNICAL FIELD

This application relates to the field of counterfeit prevention and more particularly to the field using a physically unclonable value for unique identification to prevent counterfeiting.

BACKGROUND OF THE INVENTION

The need to guarantee that one is dealing with the unique copy of a good is well established. Consider, for example, the case of banknotes. Ever since banknotes have been invented, banks and governments have been fighting duplicators and counterfeiters. A counterfeit, the so-called Super-dollar, achieved notoriety as the United States alleged that it was made by a foreign government. It has become easy to produce passable counterfeits using digital technology; $5 bills have been converted to $100 bills using ordinary HP printers, and the fraud has been recently detected only because it went on for two years and involved hundreds of counterfeits.

In the hope of mitigating the problem of forgeries, many security measures have been taken: special (e.g., embossed) paper, watermarkings, special inks, etc. Redesigned $20, $50, $10, and $5 bills were introduced between 2003 and 2008. A new $100 bill—the most commonly counterfeited bill, according to the United States Secret Service—entered circulation last year. It includes two new security features: a blue 3-D security ribbon and a color-changing bell in an inkwell. No security measure so far, however, has proved to be foolproof, and new measures have to be continually invented.

Quantum mechanics has been recently relied upon to generate unforgeable money. These schemes are very interesting, but not yet practical, and certainly difficult to analyze. The problem is exacerbated by an additional constraint: namely, its solution must not only be feasible, but also cheap. Indeed, an unforgeable $100-banknote that costs—say—$10 to mass produce would not be too useful.

Accordingly, it is desirable to provide an approach to unforgeable money (and more generally to authenticate goods and information about goods) that is practical, secure, and inexpensive.

SUMMARY OF THE INVENTION

According to the system described herein, a physical device includes means for consistently producing a particular unpredictable output based on a particular input and on microstructure of the device, means for enabling verification that the device satisfies a given property, and means for making it substantially difficult to manufacture another device that satisfies the given property and that produces the particular output in response to the particular input. The device may be an integrated circuit and the means for enabling verification may include exposing the layout of the circuit to allow comparison with a pre-specified layout.

According further to the system described herein, generating a uniquely authentic copy of information using a physical device that consistently produces unpredictable outputs based on inputs and the microstructure of the device, the device being verified to satisfy a given property, and it being substantially difficult to manufacture another device that satisfies the given property and that produces a particular output in response to a particular input. Generating the uniquely authentic copy of information includes causing the device to be provided with a specific input to produce a specific output, causing the generation of a digital signature of the response and the information, and causing at least the device and the digital signature to be made available. Generating the uniquely authentic copy of information may also include making available the information, the specific input, and/or the specific output. The information may be a value of a banknote, and the digital signature may be produced on behalf of an issuer of the banknote. The information may be information about a physical good and the physical device may be securely attached to the good. The information may be the empty information. The information may be information about the contents of a physical packet, and the physical device may securely seal the packet. The packet may be sealed, and the physical device may be secured to the seal of the packet. The packet content may be a medicinal drug, food, and/or a liquid. The digital signature may be made available on the web or as an answer to a query. At least one of: the information, the specific input, and the specific output may be made available on the World Wide Web or as an answer to a query.

According further to the system described herein, a non-transitory computer-readable medium contains software that generates a uniquely authentic copy of information using a physical device that consistently produces unpredictable outputs based on inputs and the microstructure of the device, the device being verified to satisfy a given property, and it being substantially difficult to manufacture another device that satisfies the given property and that produces a particular output in response to a particular input. The software includes executable code that causes the device to be provided with a specific input to produce a specific output, executable code that causes the generation of a digital signature of the response and the information, and executable code that causes at least the device and the digital signature to be made available. The software may also include executable code that makes available at least one of: the information, the specific input, and the specific output. The information may be a value of a banknote, and the digital signature may be produced on behalf of an issuer of the banknote. The information may be information about a physical good and the physical device may be securely attached to the good. The information may be the empty information. The information may be information about the contents of a physical packet, and the physical device may securely seal the packet. The packet may be sealed, and the physical device may be secured to the seal of the packet. The packet content may be a medicinal drug, food, and/or a liquid. The digital signature may be made available on the web or as an answer to a query. At least one of: the information, the specific input, and the specific output may be made available on the World Wide Web or as an answer to a query.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

Figure 1:
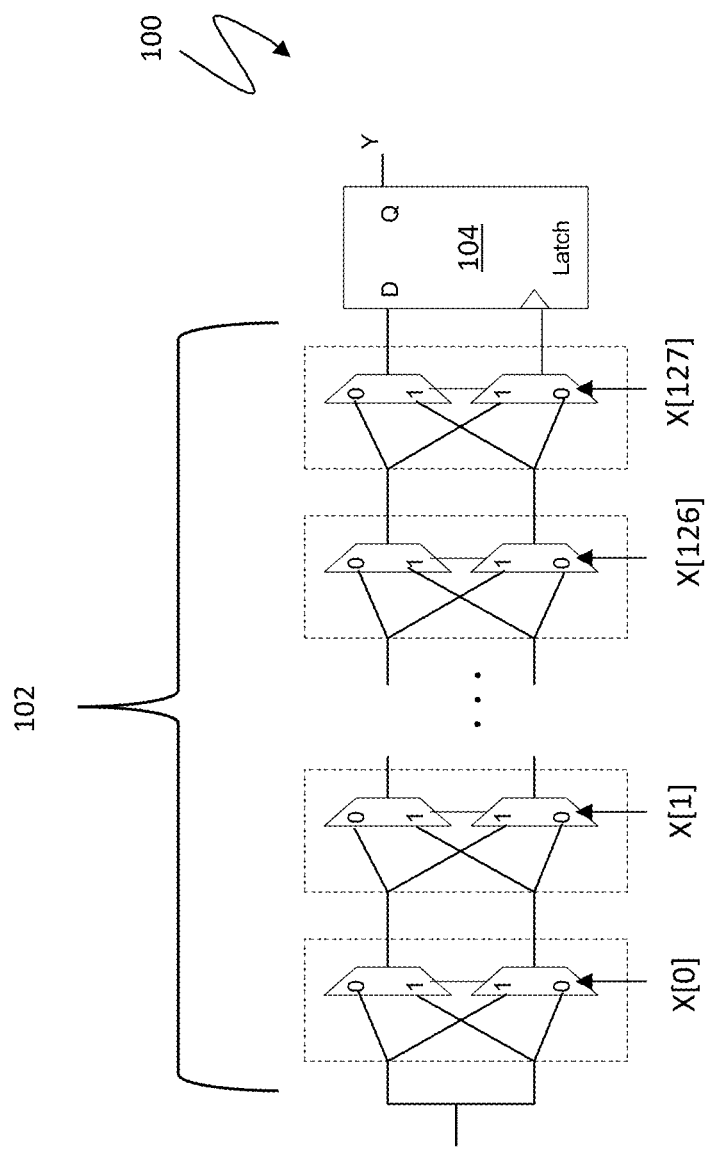
FIG. 1 is a schematic diagram illustrating an arbiter circuit, according to an embodiment of the system described herein.

The system described herein provides a mechanism to securely and cheaply manufacture unforgeable banknotes and to to ensure that goods and/or information are authentic.

A Physically Unclonable Value (PUV) is a physical device with an associated verification algorithm, A, mapping pairs of devices to just YES or NO. Essentially, if D is a PUV, then:

i) D consistently produces a unique random value in response to a single chosen input, and ii) It is hard to produce two devices D1 and D2, such that (a) A(D1)=A(D2)=YES, and (b) D1 and D2 produce the same value on the same chosen input c.

PUVs are different from PUFs. Intuitively, a PUF is a device that not only is physically uncloneable, but also is mathematically uninferrable, and is thus modeled as a blackbox random function F. In other words, no matter how one may choose a sequence of inputs $x_1, \ldots, x_n$, learning the values $F(x_1), \ldots, F(x_n)$, he should not be able to predict better the value of $F(x)$, for any $x \neq x_1, \ldots, x_n$, better than by random guessing. By contrast, a PUV is not a physically unclonable device implementing a random function, but a physical device that is unclonable, as long as the device passes the inspection of a designated verification algorithm, among all devices that pass the inspection of the same algorithm, and implementing a single "challenge-response" pair (c, v), where v has been randomly chosen, with a "stability requirement", that is, the device must output v whenever it is given c as an input. For all we are concerned, the PUV can provide the same output on all inputs other than c.

A digital signature scheme consists of three fast algorithms: a probabilistic key generator, G, a signing algorithm, S, and a verification algorithm, V. Given a number k as an input (e.g., k=4,000), a player x uses G to produce a pair of k-bit keys (i.e., strings): a "public" key $PK_x$ and a "secret" signing key $SK_x$. A public key does not "betray" its corresponding secret key. That is, even given knowledge of $PK_x$, no one other than x is able to compute $SK_x$ in less than astronomical time. Player x uses $SK_x$ to digitally sign messages. For each possible message (binary string) m, x runs algorithm S on inputs m and $SK_x$ in order to produce a string, $SIG_x(m)$, referred to as x's digital signature of m. Without loss of generality, we assume that m is retrievable from $SIG_x(m)$. In fact, if m cannot be retrieved from $SIG_x(m)$, we could always redefine the digital signature of party x of a message m to consist of the pair $(m, SIG_x(m))$. Everyone knowing $PK_x$ can use it to verify the signatures produced by x. Specifically, on inputs (a) the public key $PK_x$ of a player x, (b) a message m, and (c) an alleged digital signature of x for the message m, the verification algorithm V outputs either YES or NO, so as to satisfy the following properties:

i) Legitimate signatures are always verified: If $s = SIG_x(m)$ then $V(PK_x, m, s) = YES$; and ii) Digital signatures are very hard to forge: without knowledge of $SK_x$, if x has never signed m, finding a strings such that $V(PK_x, m, s) = YES$ requires an astronomical amount of time.

Accordingly, to prevent anyone else from signing messages on his behalf, a player x must keep his signing key $SK_x$ secret (hence the term "secret key"), and to enable anyone to verify the messages he does sign, x must make his verification key $PK_x$ public (hence the term "public key").

Referring to FIG. 1, an arbiter circuit 100 includes a plurality of multiplexers 102 and a latch 104. Generally, arbiter circuits are mathematically inferrable. The arbiter circuit 100 may be used to provide a PUV. Note that non-inferrability is not a requirement for a PUV, and it is not necessary to keep the delays secret. The circuit 100 creates two different delay paths with the same layout length for each input X, and produces an output Y based on which path is faster. The resolution of the latch 104 is sufficiently fine to ensure that, when given the same input X, the same output Y will be obtained, so long as the environment (e.g., the temperature) does not change significantly. At the same time, due to the microstructure of the circuit and in particular of the wires, the delay varies randomly from chip to chip, and thus a second arbiter circuit with the same layout of a first arbiter circuit will map an input X to an output different than that produced by the first arbiter circuit. In other words, an arbiter circuit carries in itself the means, such as the microstructure of its own wires, to ensure that it is very difficult to produce another arbiter circuit with the same layout that maps an input X to the same output Y produced by the first arbiter circuit on input X. Note that the difficulty of cloning an arbiter circuit depends on the layout being the same. Without this property it would be trivial to manufacture a circuit that on input X produces the same output Y that the circuit 100 produces. That is, having the same layout is a property of arbiter circuits that makes it practically impossible to manufacture a second arbiter circuit with the same input-out behavior of any other arbiter circuit, even on a single input. It is thus important to verify that the property in question, namely having the same layout in the case at hand, is satisfied before considering the input-output behavior.

An arbiter circuit having a pre-specified layout is just an example of a PUV. Any other PUV can be used with the system described herein. In particular, any other integrated circuit that uses its own unique microstructure as means to guarantee that the output it produces in response to a given input is substantially unpredictable, but repeatable. Also, instead of having the same layout, other properties that are satisfied by an arbiter circuit in order to make it hard to clone the arbiter circuit are also possible.

In an embodiment herein, the arbiter circuit 100 produces one bit of output for each challenge C which, in FIG. 1, is shown as having one hundred and twenty eight bits. To ensure a k-bit output for each challenge C, it is possible to augment the arbiter circuit 100 as follows: First, use C as the seed of a predetermined pseudo-random generator, such as a cryptographically secure generator, a linear-feedback shift register, or any other type of pseudo-random generator so as to obtain a sequence of k pseudo-random challenges, $C_1, C_2, \ldots, C_k$. Subsequently, the arbiter circuit 100 is challenged in order with each of the pseudo-random challenges. Finally, single-bit outputs resulting from the challenges is concatenated to obtain the desired k-bit response R.

In an embodiment herein, the arbiter circuit 100 is manufactured using a given (mask) layout L, and the microchip is not shielded, so as to make L available to observation. In some embodiments, all arbiter circuits may share the same layout L. Note that the variability in gate delays remains huge even when the layout L remains fixed. A reader is configured to provide an arbiter circuit with the challenge C and to read the corresponding response. In some embodiments, the reader may also store L within.

In operation, the reader verifies whether or not the arbiter circuit 100 simultaneously satisfies the following two properties:
 (1) the arbiter circuit 100 has layout L; and
 (2) the arbiter circuit 100 responds with R to challenge R.

To make this determination the reader performs the following:
 1) the reader observes the layout L' of the arbiter circuit 100;
 2) the reader compares L' to the stored layout L;
 3) the reader challenges the arbiter circuit 100 with C so as to obtain a response R'; and
 4) the reader accepts the arbiter circuit 100 if and only if L essentially coincides with L' and R essentially coincides with R'.

In a sense, rather than ascertaining whether a given microchip (of arbitrary and possibly unobservable layout) provides a response (close to) R to the challenge C, the reader applies a challenge to a circuit constituted by a given layout and checks whether a given response is obtained.

In an embodiment herein, the arbiter circuit 100 (or possibly another type of PUV) is embedded into an ordinary banknote to provide a secure banknote 200, possibly along with other customary anti-counterfeit protections. The banknote 200 is displays a value and a own unique serial number. The secure banknote may be manufactured as follows:
 1) Manufacture the arbiter circuit 100 with layout L.
 2) Challenge the arbiter circuit 100 with C so as to obtain and measure a response R.
 3) Have the Bank produce a digital signature S of R together with an indication of the value of the secure banknote 200 ($v), and whatever additional information (possibly none), I, is deemed useful. In particular, I may specify date information, an identifier of the secure banknote 200, the layout L of the arbiter circuit 100 (if the layout is not fixed for optimization purposes), and/or the challenge C (if the challenge is not fixed), or, in some instances, possibly no information. For instance, S=SIGBank (R, $100, I).
 4) Store S on the secure banknote 200 (e.g., in bar-code format, or in the arbiter circuit 100, if the arbiter circuit 100 is endowed with non-volatile memory).

The secure banknote 200 may be verified as follows:
 1) Have the reader ascertain that the arbiter circuit 100 of the secure banknote 200 is open-layout, and that the layout of the secure banknote 200 is sufficiently close to L.
 2) If the test in 1) is passed, challenge the arbiter circuit 100 with C to obtain a response R'.
 3) Retrieve the alleged signature S and verify that S consists of the digital signature of the bank of a triple (R, $V, I), and that R' is sufficiently close to R.
 4) If the test in 3) also passes, output an indication that the secure banknote 200 is valid and that the value is $V.

Figure 2:
FIG. 2 is a diagram illustrating a secure banknote having an arbiter circuit, according to an embodiment of the system described herein.

In FIG. 2, a hexadecimal number 202 underneath the arbiter circuit 100 represents S. The reader is able to take a picture of the arbiter circuit 100, compare the picture with stored L, and challenge the arbiter circuit 100 with C to obtain R' from the arbiter circuit 100. The reader can also read S, verify S and then compare R' against R obtained from S.

An advantage of the system described herein is that secure banknotes and readers need not store any secret information. In addition, although the secure banknotes use digital signatures, a public key infrastructure is not necessary because the system may be implemented with a single public key (e.g., the public used to verify the digital signatures of the bank) which may be publicly known within the system, without being certified by a PKI or other entity. In addition, the digital signature giving value to an unforgeable banknote need not be revoked since a banknote may continue to be valid forever. Of course, the bank has the option of physically destroying a banknote exhibiting wear and tear (or other reasons), and reissuing another banknote for the same value.

It is recommended that the response length be at least 128 bits, to make the probability of collision (i.e., same values from two different PUVs) negligible. The challenge length impacts the reliability of the Arbiter and it may be at least 64 bits. The Arbiter performs relative delay comparisons and therefore may be resistant to aging, voltage and temperature variations. Note that, unlike physically unclonable function applications in conventional integrated circuits, the voltage and temperature variation is significantly less for banknotes. Aging occurs when voltage is applied to the PUV by the reader and this happens very infrequently.

Since the Arbiter is a small circuit, one way to implement a PUV on a banknote is to use printed electronics. In this case, a picture of the PUV can be taken quite easily, and thus it is easy to decide whether a given circuit has a specified layout. Printed electronics technologies use inks and can be directly printed on a banknote (with some preprocessing).

In the system described herein, using a PUV with the same challenge C and the same layout L increases the performance due to efficiency and decrease cost of the reader software. Each secure banknote, however, can have a separate challenge and/or separate layout, which may be stored on the banknotes, together with appropriate digital signature (s). In addition, rather than storing the signature S on a secure banknote, a bank may make S available on the Web, for instance, by publishing S next to a searchable serial number of the banknote, or in response to a query. Note that this is also possible for the signatures of the challenge and/or layout of a banknote, if the challenge and/or layout are different for different banknotes. The reader may retrieve S (and possibly the challenge and/or the layout) by searching the Web for (or making a query about) the serial number of the banknote, and then proceeding as described elsewhere herein. Note that a Web-based alternative generates some "trail", in that a database associating serial numbers to signatures can track reader queries. Thus, in absence of sufficient obfuscating queries, a geo-location of banknotes may be exposed when using teh Web to obtain some of the information for the banknotes.

If banknotes are relatively unforgeable, issuing a banknote of very high value (e.g., a $1M banknote) is a relatively safe option, and enables a compact transfer of an otherwise conspicuous amount of money. If it is desired to make such high-value banknotes traceable, a bank may make signatures of high value banknotes available on the Web or in response to a query.

To increase reliability, it is possible to manufacture secure banknotes using more than one arbiter circuit. For instance, it is possible to use two arbiter circuits, the first circuit answers challenge C1 with a value R1, and the second circuit challenge C2 with value R2. In such a system, the Bank may have a signature S consisting of:

$$S=SIGBank(R1,R2,\$100,I).$$

The banknote may be considered verified if at least one challenge-response has been properly verified. Thus, if wear and tear disrupts just one of the arbiter circuits, the banknote can still be accepted, and then possibly given to the bank for destruction and reissuance.

The system described herein may be adapted to increase security of a credit card used in a physical application, that is, when the credit card is swiped to obtain payment authorization. In a physical application, of course, fraud may occur if the card is stolen, but it may also occur if the credit card is duplicated. The latter fraud may be prevented by enriching the credit card with an arbiter circuit and a digital signature (of the credit-card company) guaranteeing the response to a chosen challenge, and properly modifying traditional credit-card readers so that the readers can perform the verifications discussed above. Note that the value used for banknotes (e.g., $100) is redundant, and can be omitted.

The system described herein provides ubiquitous verification. The readers may be standardized and manufactured cheaply. Accordingly, secure banknotes may be properly verified whenever the banknotes change hands. For instance, it is possible to routinely have a reader check a banknote before accepting the banknote as payment. Also, with contactless arbiter circuits, cell phones with Near Field Communications (NFC) reader functionality and high resolution cameras, such as most Android smartphones and the recent iPhones, will allow regular users to verify banknotes received by the users.

Ubiquitous banknote verification enables an additional form of security relating to secure transportation of secure money. Although unforgeable, legitimate secure banknotes may still be stolen, and thus the physical transfer of a large quantity of secure banknotes from a bank to, for example, a local branch of the bank or to another bank, would be as insecure as transferring ordinary money. Accordingly, such a transfer would require the use of armored cars, great expense, and danger. To avoid this, it is possible to transport bills of no value or limited value, and then give the bills proper values only when the bills have safely reached an intended destination. For instance, an intended destination may be a local branch of a bank, and the Bank manufactures a bill targeted to become a $100-bill, with an embedded a specific arbiter circuit but not a digital signature. That is, although the bank has already challenged the specific arbiter circuit with C and learned the associated response R, the bank does not print S=SIGBank (R, $100, I) on the banknote, nor does the bank post S on the Web. Thus, prior to S being revealed, the bill is, literally, "just worth the paper it is printed on". The bill may thus be shipped cheaply and without protection to a desired destination. Only after the destination (preferably in a cryptographic secure way) assures receipt of the particular bill (e.g., via its serial number), the bank securely communicates S to the destination, which then prints S on the bill, or stores S in the arbiter circuit, or places S on the Web, or provides S in response to a query, etc. As discussed elsewhere herein, if some form of traceability is desired, as in the case, for example, of a bill that should become a $1M banknote, then, upon receiving a proper acknowledgement of the bill by the branch, the bank may post S on the web.

Figure 3:
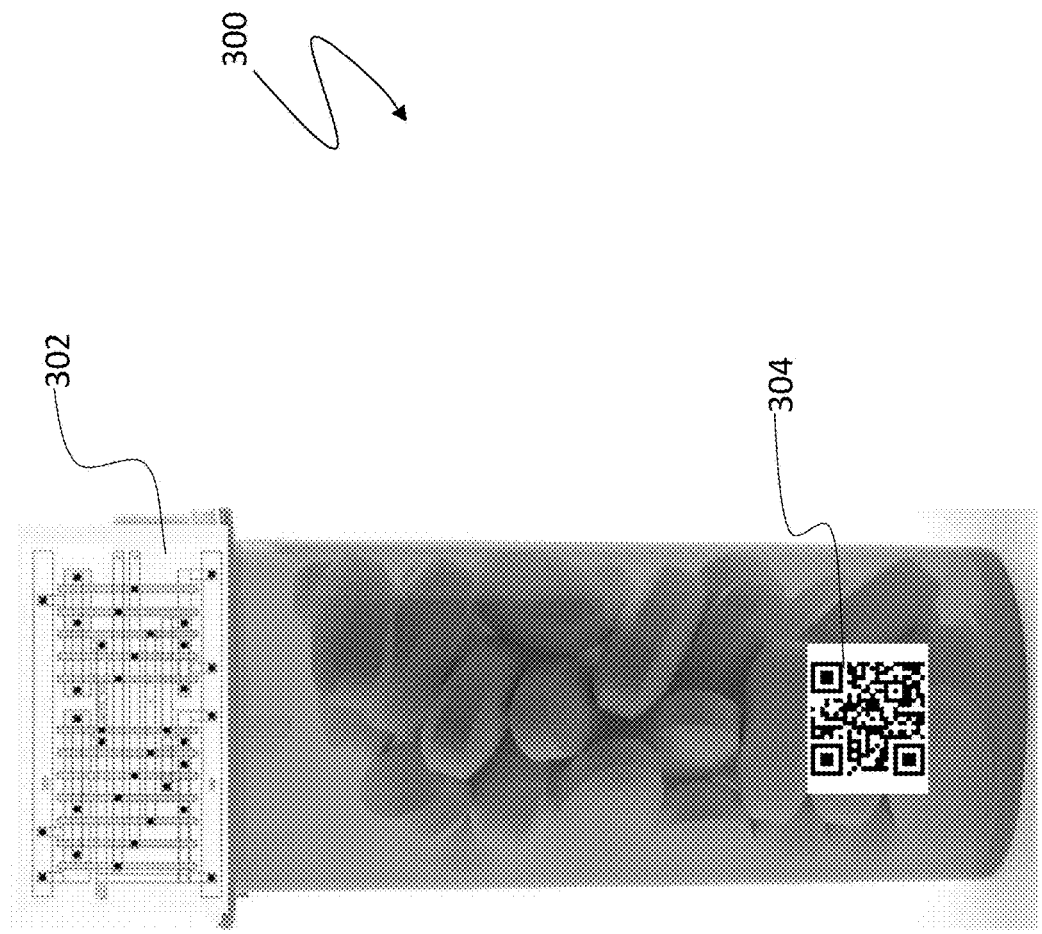
FIG. 3 is a diagram illustrating a set of pills using a PUV and additional information according to an embodiment of the system described herein.

The system described herein may be used to prove authenticity of goods. The system may also be used to prove authenticity of an individual object, or of a set of objects. Referring to FIG. 3, a pharmaceutical firm F may guarantee that a given set G of pills 300 have been manufactured by F and/or that some information I about G holds. For example, F has a public verification key PKF and a corresponding secret signing key SKF. Having manufactured a set G of one of more pills, F wishes to assure possible distributors, vendors, or buyers of the authenticity of the information I that includes an indication of F or information about F (possibly to the level of the specific manufacturing facility) and information about the chemical composition of the pills, the pill production date and/or the pill expiration date, etc. To this end, the set of pills may be put in a proper container and securely sealed in a way that includes an arbiter circuit 302. For instance, a container is sealed (preferably in a way that makes it hard to access the content without breaking the seal and leaving no trace) and the arbiter circuit 302 is securely attached to the seal. That is, the arbiter circuit 302 is attached in a way that makes it impossible (or nearly so) to open the seal without detaching the arbiter circuit 302, where detaching the arbiter circuit 302 causes the arbiter circuit 302 to produce a different value (or different values) than before detachment, or to become unable to produce any value at all. For instance, the container may consists of a sealed piece of aluminum foil with an arbiter circuit properly embedded in the foil. Alternatively, the seal may consist of a plastic bottle and the arbiter circuit 302 may be properly placed between a cap and body of the bottle.

F provides the arbiter circuit 302 with a challenge C and obtains the response R. In particular, the challenge-response may be obtained after the arbiter circuit 302 is properly embedded, if embedding the arbiter circuit 302 may alter a challenge-response behavior of the arbiter circuit 302. F directly or indirectly digitally signs R, and I. (Here and elsewhere in this application, signing something includes the possibility of signing R and I possibly with other data as well—e.g., R and I and C). For instance, S=SIGF (C, R, I) or S=SIGF(R,I) are deemed a direct signature of F of R and I. Those skilled in the art may appreciate that, in this particular example, or anywhere else in herein, S may be an indirect signature. For example, without any restriction intended, to signify its backing of a particular piece of data string D, such as D=(C, R, I), F may generate two data strings D1 and D2 that combined yield D (e.g., interpreting the two data strings as numbers, such that D1+D2=D) and then producing an indirect signature of D, S, consisting of a direct signature of D1, S1, and a direct signature of D2, S2. This way, it is possible to verify that S1 is a direct signature of D1, that S2 is a direct signature of D2, and thus that the signer intended to vouch for D=D1+D2. The signature S and the information I are then written (in suitable form) on the container itself, or in an accompanying document, or posted on the Web, or made available in response to a query or made available in another manner (or in a combination thereof). In an embodiment herein, S and I are provided as a bar code 304 attached to the bottle of pills 300. A buyer or a distributor may verify the container by inspecting integrity of the container and seal, reading the information I, challenging the circuit 302 with C, obtaining a response R', verifying that S is F's digital signature of R and I, and that R and R' are the same or sufficiently close. If all checks are passed, a verifier who trusts F, may also have confidence that the content of the container is as specified in I.

Of course, in this example (and elsewhere herein), some or all steps may be performed by different entities. For example, the pharmaceutical company F may manufacture the pills, but not perform all or part of the other steps. In particular, the pharmaceutical company F could subcontract some or all of the other steps to a separate entity F', and the information I may include an indication of F' and/or S=SIGF' (C, R, I). Also, while using a container may provide some savings, by enabling F to process multiple objects at once, F may prefer to embed an individual arbiter circuit on each individual object. Of course too, information I may be the empty information. For instance, if F produces a digital signature S of just R and someone verifies that S is indeed a digital signature of R, and that R is the circuit response to a standard challenge C, where the circuit securely seals a packet of pills, then, although not having additional information about the pills in the packet, the verifier is guaranteed that the pills are indeed manufactured by F.

The system described herein may be generalized in a number of ways. The arbiter circuit may be understood as any PUV, in particular, one that corresponds to a device D, capable of receiving inputs and generating corresponding outputs, that can consistently produce, on input C, an unpredictable output R. Note that inputs and/or outputs may or may not be in digital form. For instance, inputs may be instructions on how to operate on the device (including shaking the device or applying a given voltage to parts of the device, such as wires) and outputs may consist in the observed reaction of the device to the instructions, and possibly translated into alpha-numeric strings afterwards. Unpredictability refers to the scenario that, without using D itself (e.g., by giving D the input C and then observing the output R that D produces), it is not possible to predict a value R the device D will output on input C. Ideally, R may be perfectly random, that is, if R is a bit string, then each of its bits has a probability one half of being zero and one. But no such perfection is necessary. For instance, if R is a sufficiently long string of (without loss of generality) bits, then for R to be unpredictable, it suffices that each bit of R cannot be guessed correctly with, for example, a probability of greater than 60%. Also, consistency does mean that D must always produce R on input C: for instance, it suffices that D does so most of the times, such as, for example, 80% of the time. Indeed, in such a case, R may be found by giving D input C multiple times and seeing which output is most frequent. Actually, it also suffices that D produces R on input C a non-negligible percentage of the time, for example 5% of the time, and that each value R' is produced by D on input C a significantly less percentage of the time, for example, less than 2%. In fact, by giving C as an input to D multiple times, it is possible to determine the value R that is produced with higher frequency. The indication that that D produces R on input C, includes any of the ways to compute R discussed herein, and appropriate others as well.

The system described herein provides that D can be easily inspected to satisfy a specific property P, and that it is difficult to find another device D', different from D, that satisfies the property P and consistently produces R on input C. Specifically, there is a concrete device A deciding whether a device satisfies property P. For instance, if PUVs consist of arbiter circuits, then P may be the property of having a given layout L, and to enable the verification of the property, it is useful to leave the circuit layout exposed. In particular, it is useful to be able to verify that L has no cuts, and thus that R comes from the circuit rather than a hidden miniaturized circuit. Printable circuits are actually a good choice if it is desirable to rely on a property of having a given layout L. A reader may be loaded with an image or information about the layout L, but in general A can be any device capable of determining whether a PUV satisfies a given property P. Note that the property P and the device A may be chosen by a same entity manufacturing D, or not. For instance, an entity may simply cause (e.g., request) production of a PUV by having P chosen by a different entity, A by another entity, and D manufactured by yet another entity. In particular, making A includes the possibility that A was already available. Alternatively, device A may have already existed, but is made capable of verifying property P by downloading to A or causing A to download software with which A can verify whether the property P holds.

The system described herein may guarantee that a given copy of a piece of information I is uniquely authentic. A 'copy' of I may mean anything from which I can be correctly retrieved. Any piece of information, including I, may be encoded as a string (e.g., a string of bits or other symbols), and the authenticity of such a string can be guaranteed by means of a digital signature. However, such string can be easily duplicated together with its digital signature, thus making it possible to anyone to generate two identical and authenticated copies of I. A copy of authenticated information I may be 'uniquely authentic' if it is difficult (i.e., impossible, practically impossible, or too expensive) to generate a second authenticated copy of I. A party may generate a uniquely authenticated copy of some information I, by having the party obtain (e.g., manufacture, cause to manufacture, or buy) a PUV D that, on input C produces an output (consistently produces an unpredictable output) R. The party may then digitally sign (or more generally having someone else digitally sign—e.g., on behalf of the party) R and I to produce a signature S. The party may then release or otherwise make available (or having someone else release or otherwise make available) C, R, S, and I.

Note that, taken together, the five quantities D, C, R, S, and I, are an authenticated copy of I, since I is one of the quantities. A verifying party verifies authenticity of such a copy is verified as follows: Let P be the property of the PUV and A the apparatus for verifying whether a device satisfies property P. Then, to verify the copy, the verifying party verifies that, on input C, D produces the output R; verifies that S is a valid digital signature of R and I of the correct entity (e.g., the party in question or another party acting on behalf of the party in question); and accepts the copy as authentic if both verifications are passed. Note too that D, C, R, S, and I actually constitute a uniquely authenticated copy of I, since it is difficult to find two different PUVs D and D' that produce the same result R on the same input C.

Also note that it is possible to provide a copy of I consisting of just four of the above quantities: e.g., of just D, C, S, and I. It is possible to compute R by just giving C as an input to D. Note that, relative to such four-quantity copies, D, C, S, and I continues to be a uniquely authentic copy of I. If the input C is fixed or publicly known, C too becomes redundant, that is, D, S, and I constitute a three-quantity copy of I that is also uniquely verifiable. Finally, if the signature S of R and I is such that R and I can be computed from S anyway, then D and S alone constitute a two-quantity copy of I that is also uniquely verifiable.

Note that a digital signature of R and I may consist of a digital signature of the pair (R,I), or the string R|I obtained by concatenating R and I, preferably with some symbol making it clear where R ends and I begins, or of H(R,I), where H is a one-way hash function, or any other way that correctly pins down R and I. Of course digitally signing R and I includes digitally signing R, I, and any other additional information I', for instance I' may include date information or the input C. It is possible to use PUVs to authenticate a good or a set of goods. The good or goods need not be a pill or a medical drug, as described above. In addition, the PUV may be securely attached to the good itself (goods themselves), rather than to a packet including the good(s). As described elsewhere herein, securely attaching a PUV to a good means that removing the PUV causes the PUV not to produce an output in response to an input, or to produce an output that is different than the one the PUV would have produced before being detached. One can then use the PUV to authenticate information about an individual good in the same way one uses the PUV to authenticate information about the content of a packet contain one or more goods (such as a set of pill). Of course, the type of information to be authenticate varies with the application. For instance, a fashion designer may wish to prevent someone to illegitimate reproduce the goods it produces. For instance, Gucci or Vuitton may want the lady bags it produces to be easily distinguished from cheaper counterfeits, RayBan may want to do the same for the glasses it produces, and so forth. Unfortunately, it may not be easy to guarantee to a customer that the good he or she is buying is manufactured by the claimed designer. To do so, the designer may have a PUV D securely attached to G, a good the designer produces, have an input C be given to D so as to produce an output R, digitally sign (or have someone lese digitally sign) R and I (where I may contain an indication of the designer) so as to produce a digital signature S, and have S (possibly together with C and/or R, and or I) made available on the good itself, which includes the PUV D attached to the good. The information I about the good is thus uniquely authenticated. The verification of such information is verified in a way similar to before.

Figure 4:
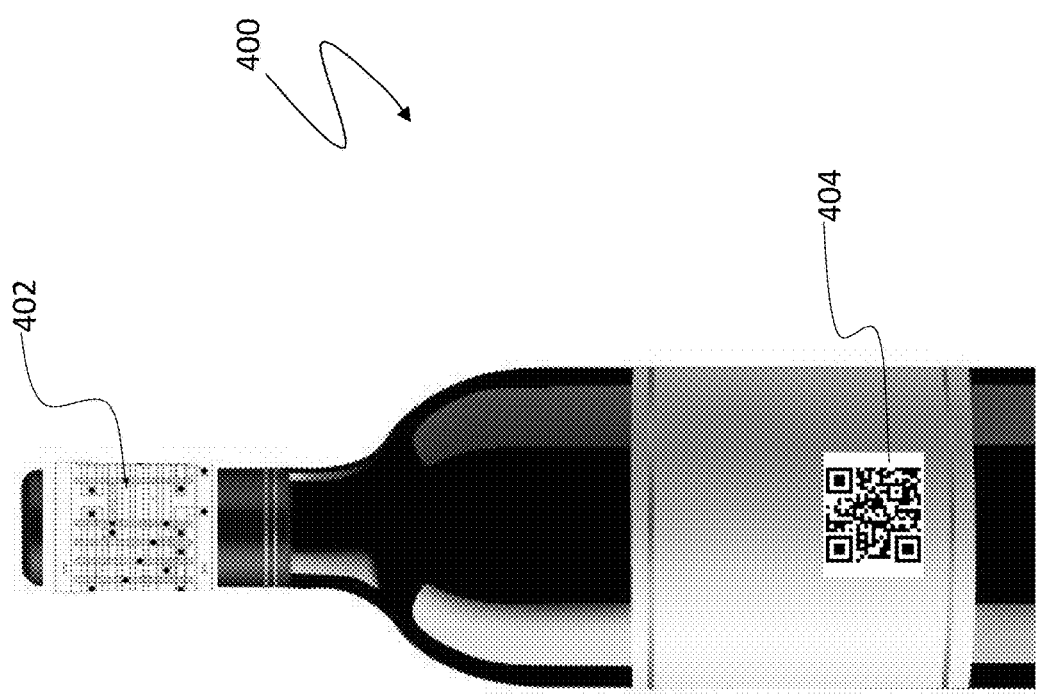
FIG. 4 is a diagram illustrating a bottle of wine using a PUV and additional information according to an embodiment of the system described herein.

A good can also be wine. Referring to FIG. 4, a bottle of wine 400 includes a PUV 402 and a bar code 404 containing digitally signed information. In this case, the information may specify the producer, the year, the time of the harvest of the grape, information about the fermentation process, etc. The good may be another form of liquid, and so on.

Figure 5:
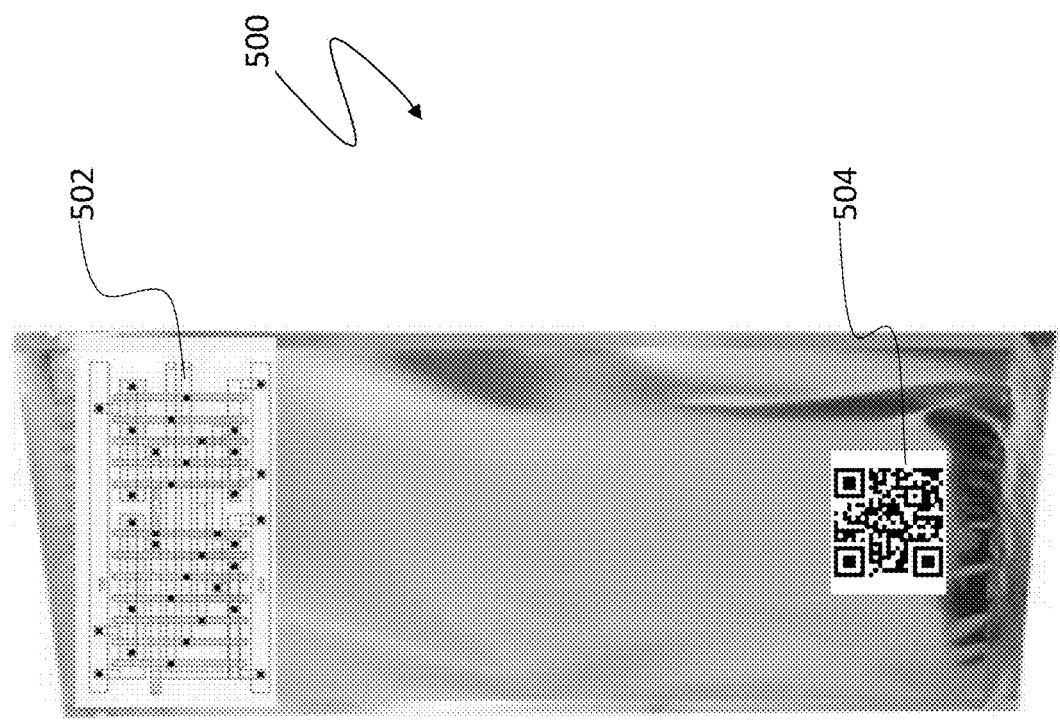
FIG. 5 is a diagram illustrating a packet using a PUV and additional information according to an embodiment of the system described herein.

Referring to FIG. 5, a packet 500, which may be a metallic packet, includes a PUV 502 that may be soldered to the packet 500 or possibly glued. Digitally signed information may be presented as a bar code sticker 504 that is also either soldered or glued to the packet 500. Note that when a PUV D is attached to a good or a packet, the information I may be empty (i.e., the information I may be null). This may be useful in cases where one wishes to authenticate only that the good or the goods into a packet come from a specific manufacturer. For example, if Gucci or Vuitton produces a bag which it wishes to uniquely authenticate, then it may securely attach (or cause to securely attach) a PUD D to the bag, provide an input C to D to produce an output R, and then digitally sign (or have someone sign of its behalf) just R, and make the digital signature available (e.g., by storing it into D itself, on the bag somewhere, on the web or in response to a query.) In this case, it is possible to verify that Gucci (respectively, Vuitton) is the producer of the bag by giving C as an input to D, obtain the response R, and then verifying that the digital signature made available is indeed the digital signature of R of Gucci (respectively, Vuitton).

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A physical device, comprising:
   a circuit having a particular layout that consistently produces a particular unpredictable output based on a particular input and based on microstructure of the device; and
   means for making the layout available for observation, wherein other devices having the particular layout produce other outputs that are different from the particular output in response to the particular input and wherein the physical device is verified by confirming through observation that the physical device corresponds to a pre-specified layout and confirming a digital signature of expected output of the circuit.

2. A physical device according to claim 1, wherein the means for making the layout available for observation includes exposing the particular layout of the circuit to allow comparison with an image of the pre-specified layout.

3. A method of generating a uniquely authentic copy of information using a physical device having a circuit, the method comprising:
   causing the device to be provided with a specific input to produce a specific output, the device having a particular layout that is verifiable, wherein other devices having the particular layout produce outputs that are different from a particular output in response to the specific input and wherein the device consistently produces unpredictable outputs based on inputs and based on the microstructure of the device;
   causing generation of a digital signature of the specific output and additional information; and
   causing at least the particular layout of the device and the digital signature to be used for verification, wherein the physical device is verified by confirming through observation that the physical device corresponds to a pre-specified layout.

4. A method according to claim 3, further comprising:
   making available at least one of: the information, the specific input, and the specific output.

5. A method according to claim 4, wherein at least one of: the information, the specific input, and the specific output is made available on the World Wide Web or as an answer to a query.

6. A method according to claim 3, wherein the information is a value of a banknote, and the digital signature is produced on behalf of an issuer of the banknote.

7. A method according to claim 3, wherein the information is information about a physical good and the physical device is securely attached to the good.

8. A method according to claim 7, wherein the information is the empty information.

9. A method according to claim 3, wherein the information is information about the contents of a physical packet, and the physical device securely seals the packet.

10. A method according to claim 9, wherein the packet is sealed, and the physical device is secured to the seal of the packet.

11. A method according to claim 9, wherein the packet content is at least one of: a medicinal drug, food, or a liquid.

12. A method according to claim 3, wherein the digital signature is made available on the web or as an answer to a query.

13. A non-transitory computer-readable medium containing software that generates a uniquely authentic copy of information using a physical device having a circuit, the software comprising:

executable code that, when executed, causes the device to be provided with a specific input to produce a specific output, the device having a particular layout that is verifiable, wherein other devices having the particular layout produce outputs that are different from a particular output in response to the specific input and wherein the device consistently produces unpredictable outputs based on inputs and based on the microstructure of the device;

executable code that, when executed, causes generation of a digital signature of the specific output and additional information; and executable code that, when executed, causes at least the particular layout of the device and the digital signature to be used for verification, wherein the physical device is verified by confirming through observation that the physical device corresponds to a pre-specified layout.

14. A non-transitory computer readable medium according to claim 13, the software further comprising:

executable code that makes available at least one of: the information, the specific input, and the specific output.

15. A non-transitory computer-readable medium according to claim 14, wherein at least one of: the information, the specific input, and the specific output is made available on the World Wide Web or as an answer to a query.

16. A non-transitory computer-readable medium, according to claim 13, wherein the information is a value of a banknote, and the digital signature is produced on behalf of an issuer of the banknote.

17. A non-transitory computer-readable medium according to claim 13, wherein the information is information about a physical good and the physical device is securely attached to the good.

18. A non-transitory computer-readable medium according to claim 17, wherein the information is the empty information.

19. A non-transitory computer-readable medium according to claim 13, wherein the information is information about the contents of a physical packet, and the physical device securely seals the packet.

20. A non-transitory computer-readable medium according to claim 19, wherein the packet is sealed, and the physical device is secured to the seal of the packet.

21. A non-transitory computer-readable medium according to claim 19, wherein the packet content is at least one of: a medicinal drug, food, or a liquid.

22. A non-transitory computer-readable medium according to claim 13, wherein the digital signature is made available on the web or as an answer to a query.

* * * * *